US010084693B2

United States Patent
Kim et al.

(10) Patent No.: US 10,084,693 B2
(45) Date of Patent: Sep. 25, 2018

(54) METHOD FOR TRANSMITTING/RECEIVING SIGNAL RELATED TO NBIFOM IN WIRELESS COMMUNICATION SYSTEM, AND APPARATUS THEREFOR

(71) Applicant: LG ELECTRONICS INC., Seoul (KR)

(72) Inventors: Laeyoung Kim, Seoul (KR); Hyunsook Kim, Seoul (KR); Jinsook Ryu, Seoul (KR); Jaehyun Kim, Seoul (KR); Taehun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/517,032

(22) PCT Filed: Oct. 6, 2015

(86) PCT No.: PCT/KR2015/010545
§ 371 (c)(1),
(2) Date: Apr. 5, 2017

(87) PCT Pub. No.: WO2016/056815
PCT Pub. Date: Apr. 14, 2016

(65) Prior Publication Data
US 2017/0310585 A1 Oct. 26, 2017

Related U.S. Application Data

(60) Provisional application No. 62/060,539, filed on Oct. 6, 2014.

(51) Int. Cl.
*H04L 12/721* (2013.01)
*H04W 28/18* (2009.01)
(Continued)

(52) U.S. Cl.
CPC .............. *H04L 45/38* (2013.01); *H04L 47/20* (2013.01); *H04W 28/0215* (2013.01);
(Continued)

(58) Field of Classification Search
CPC ........ H04L 45/38; H04L 47/20; H04W 28/18; H04W 28/0215; H04W 40/02; H04W 76/045; H04W 76/25; H04W 48/16
See application file for complete search history.

(56) References Cited

U.S. PATENT DOCUMENTS

2005/0091333 A1  4/2005  Kobayashi et al.
2014/0068200 A1  3/2014  Schnapp et al.
(Continued)

FOREIGN PATENT DOCUMENTS

WO  WO 2010/108426 A1  9/2010
WO  WO 2013/082245 A1  6/2013

OTHER PUBLICATIONS

3rd Generation Partnership Project, "Technical Specification Group Services and System Aspects; Network Based IP Flow Mobility (Release 13)," 3GPP TR 23.861, V1.9.1, Jul. 28, 2014, pp. 1-123.
(Continued)

*Primary Examiner* — Jianye Wu
(74) *Attorney, Agent, or Firm* — Birch, Stewart, Kolasch & Birch, LLP

(57) ABSTRACT

One embodiment of the present invention relates to a method for transmitting/receiving a signal related to network-based IP flow mobility (NBIFOM) in a wireless communication system, the method comprising the steps of: a terminal receiving a routing rule from a network, in network initiated mode in which the terminal cannot generate the routing rule; transmitting a rejection of the routing rule to the network; and transmitting, to the network, information indicating the availability of an access type included in the
(Continued)

routing rule, when the access type included in the routing rule becomes available.

12 Claims, 11 Drawing Sheets

(51) Int. Cl.
- *H04W 40/02* (2009.01)
- *H04W 76/25* (2018.01)
- *H04W 48/16* (2009.01)
- *H04W 76/04* (2009.01)
- *H04L 12/813* (2013.01)
- *H04W 28/02* (2009.01)

(52) U.S. Cl.
CPC ........... *H04W 28/18* (2013.01); *H04W 40/02* (2013.01); *H04W 48/16* (2013.01); *H04W 76/045* (2013.01); *H04W 76/25* (2018.02)

(56) References Cited

U.S. PATENT DOCUMENTS

2015/0327114 A1* 11/2015 Gupta ................. H04W 40/248
370/235

2015/0382393 A1* 12/2015 Kiss ..................... H04W 76/16
370/328

OTHER PUBLICATIONS

Ericsson, "Network-initiated IFOM Using S2a and GTP," SA WG2 Meeting #104, S2-142364 (S2-142679), SA WG2 Temporary Document, First Change (revision of S2-14xxxx), Dublin, Ireland, Jul. 7-11, 2014, pp. 1-7.

Qualcomm Incorporated, "Basic Principles for NB_IFOM Solutions," SA WG2 Meeting #104, S2-142566, SA WG2 Temporary Document, (revision of S2-14xxxx), Dublin, Ireland, Jul. 7-11, 2014 (Jul. 2, 2014), pp. 1-5.

3rd Generation Partnership Project, "Technical Specification Group Services and System Aspects; Network Based IP Flow Mobility (Release 13)," 3GPP TR 23.861, V1.9.1, Jul. 2014, (EPO Server date Jul. 25, 2014), pp. 1-123, XP050835286.

Zte et al., "IP Flow Mobility Solutions for S2b (GTP)—UE-Initiated and Network-Initiated IP Flow Mobility," SA WG2 Meeting #104, S2-142449, Dublin, Ireland, Jul. 7-11, 2014 (Jul. 2, 2014), pp. 1-16, XP050836884.

* cited by examiner

FIG. 10
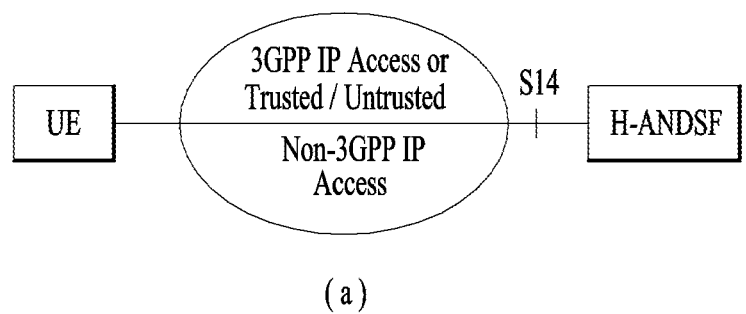
(a)
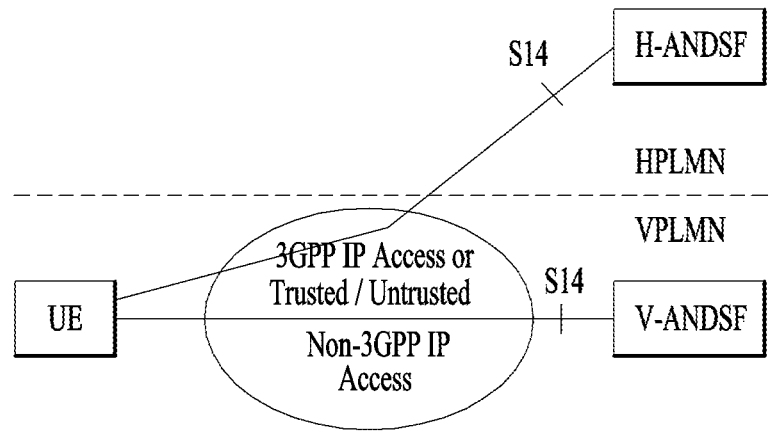
(b)

METHOD FOR TRANSMITTING/RECEIVING SIGNAL RELATED TO NBIFOM IN WIRELESS COMMUNICATION SYSTEM, AND APPARATUS THEREFOR

CROSS REFERENCE TO RELATED APPLICATIONS

This application is a National Phase of PCT International Application No. PCT/KR2015/010545, filed on Oct. 6, 2015, which claims priority under 35 U.S.C. 119(e) to U.S. Provisional Application No. 62/060,539, filed on Oct. 6, 2014, all of which are hereby expressly incorporated by reference into the present application.

TECHNICAL FIELD

The present invention relates to a wireless communication system, and more particularly, to a method for transmitting/receiving a signal related to NBIFOM (network based IP flow mobility) and an apparatus therefor.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An object of the present invention is to provide a mechanism that efficiently provides IP flow mobility between a 3GPP access network and a WLAN access network in a mobile communication system such as a 3GPP EPS (evolved packet system). Particularly, the present invention suggests a network initiated NBIFOM method for efficiently processing loss or recovery from loss of a 3GPP access or WLAN access of a UE.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one embodiment of the present invention, a method for transmitting and receiving a signal related to network-based IP flow mobility (NBIFOM) of a UE in a wireless communication system comprises the steps of receiving a routing rule in the UE from a network in a network-initiated mode in which the UE fails to generate the routing rule; transmitting a rejection of the routing rule to the network; and transmitting, to the network, information indicating that an access type included in the routing rule is usable when the access type included in the routing rule becomes usable.

In one embodiment of the present invention, a UE for transmitting and receiving a signal related to network-based IP flow mobility (NBIFOM) in a wireless communication system comprises a transceiving module; and a processor, wherein the processor receives a routing rule from a network in a network-initiated mode in which the UE fails to generate the routing rule, transmits a rejection of the routing rule to the network, and transmits, to the network, information indicating that an access type included in the routing rule is usable.

An NBIFOM mode related to PDN connection may be maintained until the PDN connection is released.

The PDN connection may be a multi-access PDN connection in which traffic can be routed through multi-access generated by the UE.

The routing rule may include an access type to which an IP flow should routed.

The access type included in the routing rule may be a 3GPP access.

The access type included in the routing rule may be a WLAN access.

The rejection of the routing rule may include information on a cause of rejection.

The cause may be one of quality of the access type, coverage related to the access type, and loss of the access type.

The information indicating the access type included in the routing rule is usable may be transmitted through the same access as the access type included in the routing rule.

The information indicating the access type included in the routing rule is usable may be transmitted through the same access as the access type that has received the routing rule.

A routing rule, which includes the usable access type, may further be received from the network after the information indicating that an access type included in the routing rule is usable is transmitted to the network.

Advantageous Effects

According to the present invention, a network initiated NBIFOM method for efficiently processing loss or recovery from loss of a 3GPP access or WLAN access of a UE is suggested.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIGS. 10(a) and 10(b) illustrate a network control entity for access network selection.

BEST MODE FOR CARRYING OUT THE INVENTION

Figure 1:
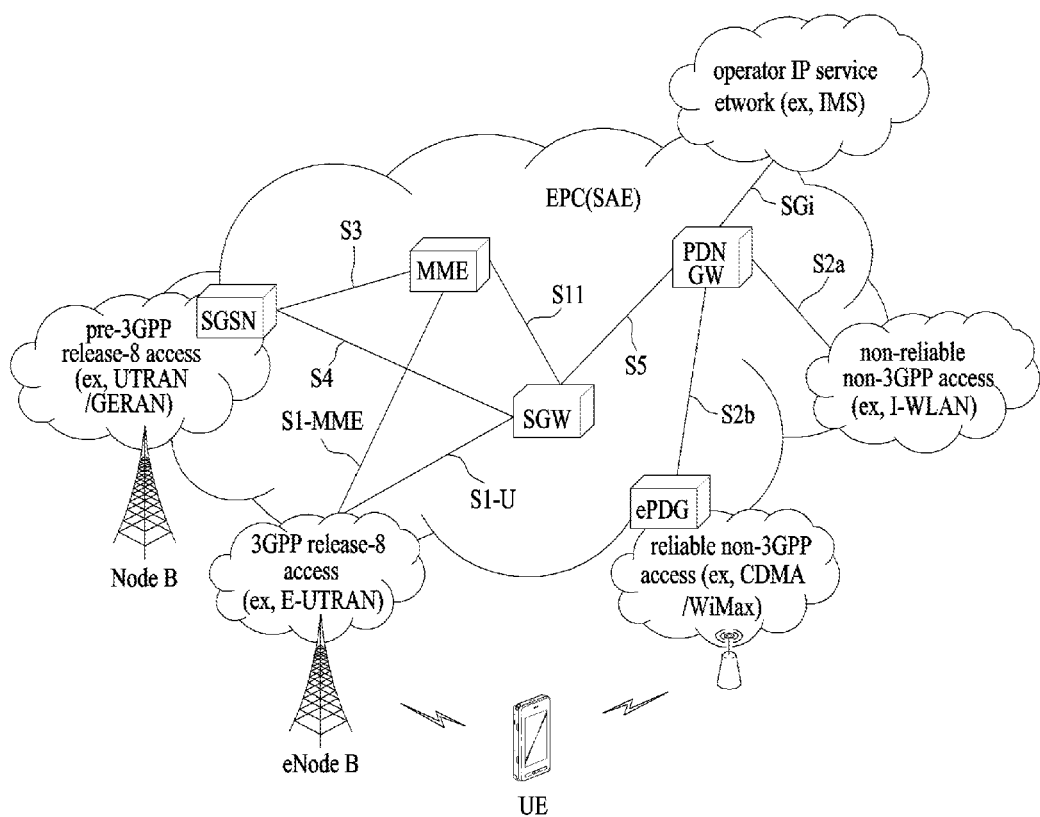
FIG. 1 is a diagram illustrating a brief structure of an evolved packet system (EPS) that includes an evolved packet core (EPC).

The embodiments below are combinations of components and features of the present invention in a prescribed form. Each component or feature may be considered as selective unless explicitly mentioned as otherwise. Each component or feature may be executed in a form that is not combined with other components and features. Further, some components and/or features may be combined to configure an embodiment of the present invention. The order of operations described in the embodiments of the present invention may be changed. Some components or features of an embodiment may be included in another embodiment or may be substituted with a corresponding component or feature of the present invention.

Specific terms used in the description below are provided to help an understanding of the present invention, and the use of such specific terms may be changed to another form within the scope of the technical concept of the present invention.

In some cases, in order to avoid obscurity of the concept of the present invention, a known structure and apparatus may be omitted, or a block diagram centering on core functions of each structure or apparatus may be used. Moreover, the same reference numerals are used for the same components throughout the present specification.

The embodiments of the present invention may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present invention in the embodiments of the present invention may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical spirits of the present invention is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME'S UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC (SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

Mission Critical Push To Talk: a group communication service that provides a fast establishment time, a capability capable of processing a large scaled group, powerful security, and priority handling.

ANDSF (Access Network Discovery and Selection Function): This is one of network entities for providing a policy for discovering and selecting an access that can be used by a UE on an operator basis.

ISRP (Inter-System Routing Policy): This is a rule defined by the operator to indicate which one will be used by the UE for routing of IP traffic among several radio access interfaces. The ISRP may include three types of rules as follows, as a policy for defining an access network preferred (i.e., having a high priority) or restricted to route/steer a packet service (or an IP flow or IP traffic or applications). That is, the ISRP may be divided into an IP flow mobility (IFOM) rule, a multi access PDN connectivity (MAPCON) rule, and a non-seamless WLAN offload (NSWO) rule as follows.

IFOM (IP Flow Mobility) rule: This rule is in regards to a list in which access technologies/access networks to be used by the UE are arranged according to a priority, when traffic matched to a specific IP traffic filter can be routed on a specific APN or on a random APN. Further, this rule may designate for which radio access the traffic matched to the specific IP traffic filter is limited on the specific APN or on the random APN.

MAPCON (Multi Access PDN Connectivity) rule: This rule is a list in which the access technologies/access networks to be used by the UE are arranged according to the priority when a PDN connection for the specific APN can be routed. Further, this rule may designate for which radio access a PDN connection to a specific APN will be limited.

NSWO (Non-seamless WLAN offload) rule: This rule designates whether certain traffic will be offloaded or not offloaded non-seamlessly to a WLAN.

ISMP (Inter-System Mobility Policy): This is a set of rules defined by an operator to have an impact on an inter-system mobility decision made by the UE. When the UE can route IP traffic on a single radio access interface, the UE may use ISMP to select the most appropriate access technology type or access network in a given time.

RAN rule: This is a rule received from the network and is called RAN support information. The RAN rule is also called WLAN interworking supported by the RAN used without ANDSF ISRP/ISMP. When the RAN rule for moving traffic to the WLAN is satisfied, an access stratum (AS) layer of the UE delivers a move-traffic-to-WLAN indication and a WLAN identifier together to a higher layer of the UE. Alternatively, when the RAN rule for moving the traffic to the 3GPP access is satisfied, the AS layer of the UE delivers a move-traffic-from-WLAN indication to the higher layer of the UE. 3GPP. 3GPP TS 23.401, TS 23.060, TS 23.402, TS 36.300, TS 36.304, TS 36.331, TS 25.304, and TS 25.331 may be incorporated herein for detailed descriptions on the RAN rule.

Local Operating Environment Information: This is a set of implementation specific parameters which describe the local environment in which the UE is operating.

Network-Based IP Flow Mobility (NBIFOM): This is IP flow mobility based on network based mobility protocol (GTP or PMIP).

UE-initiated NBIFOM: This is NBIFOM in which the UE initiates IP flow mobility.

Network-initiated NBIFOM: This is NBIFOM in which the network initiates IP flow mobility.

Multi-access PDN connection: This is a PDN connection in which traffic can be routed through the 3GPP access and/or the WLAN access. Each IP flow is routed only through one access at one instance.

Routing filter: This is a set of IP header parameter values/ranges of a packet flow used to identify IP flow for the purpose of routing.

Routing access type: This is a type of an access for routing a set of IP flows of PDN connection (3GPP access or WLAN access.

Routing Rule (RR): This is a set of information that enables association between the routing filter and the routing access type.

Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
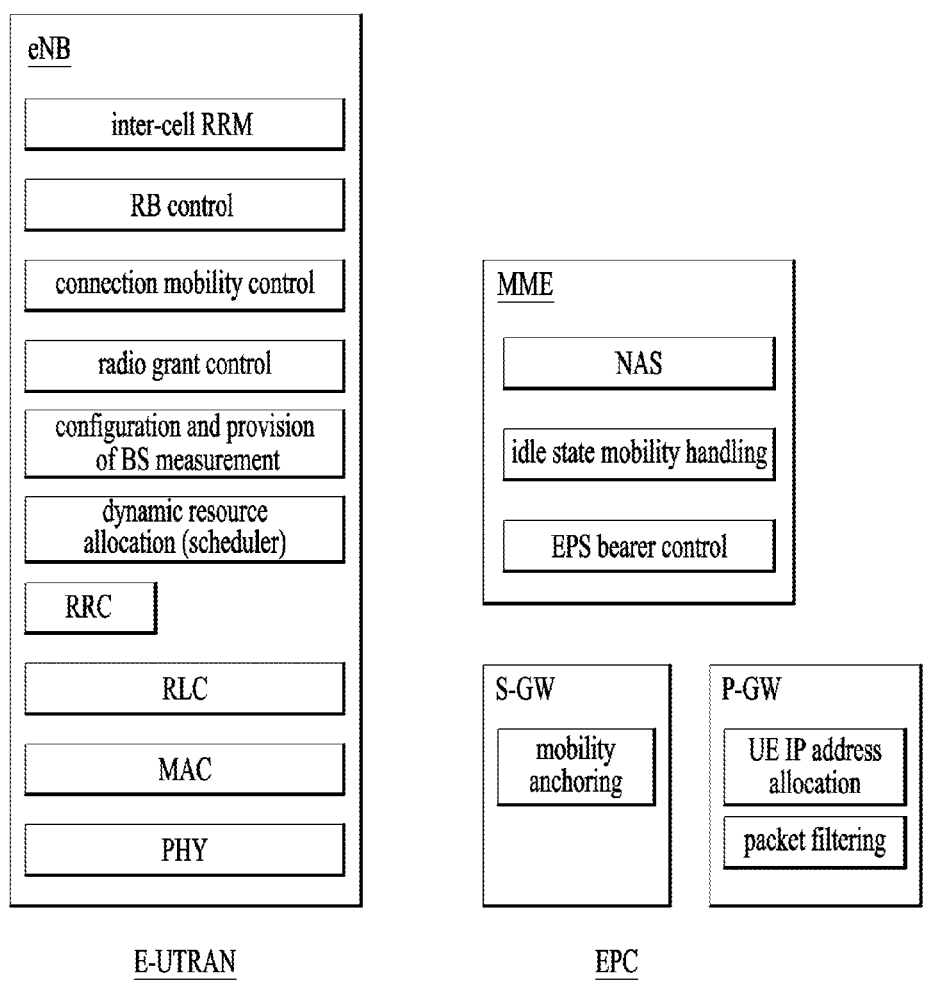
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
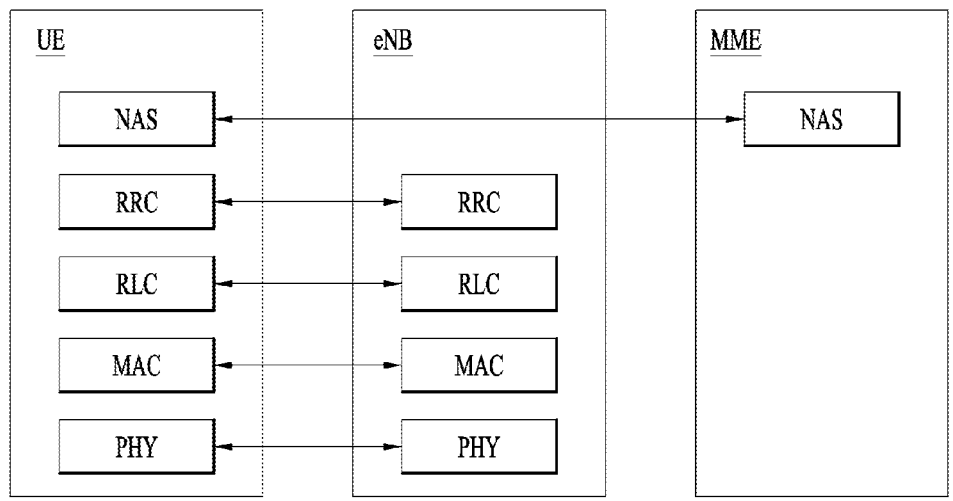
FIG. 3 is an exemplary diagram illustrating a structure of a radio interface protocol on a control plane.
Figure 4:
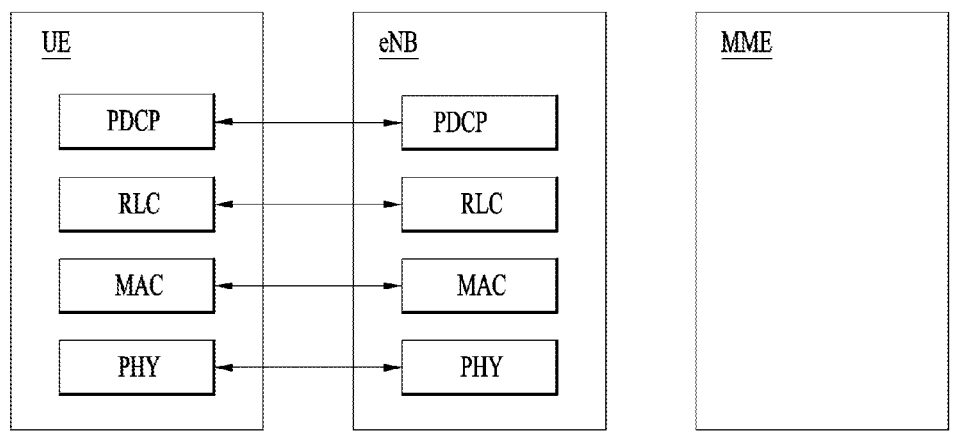
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PDSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PDCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
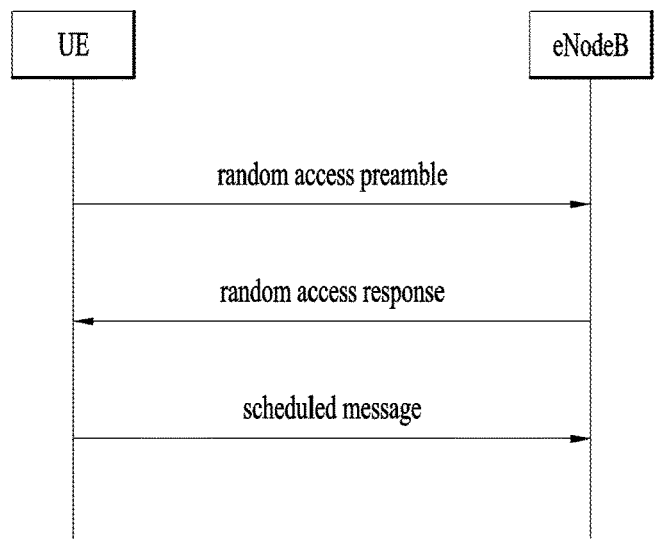
FIG. 5 is a flow chart illustrating a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
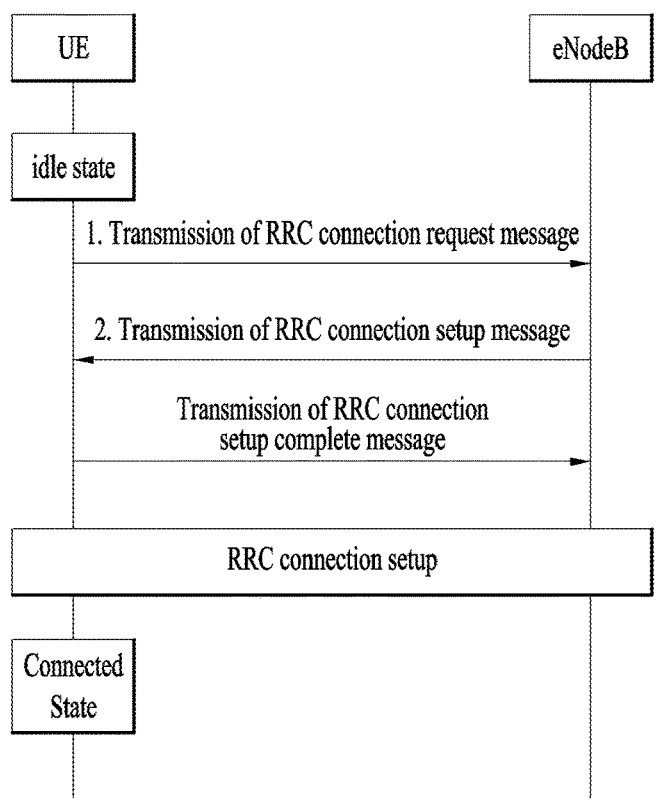
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

Connection of WLAN and EPC

Figure 7:
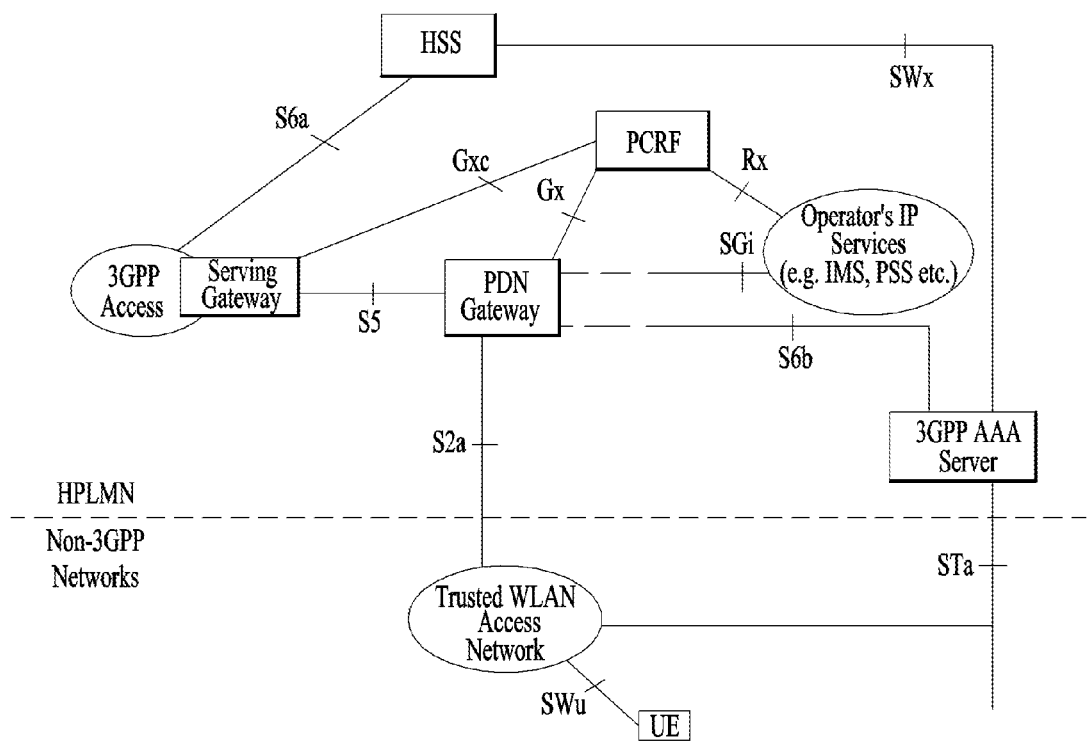
FIGS. 7 and 8 illustrates an example of a structure of a WLAN connected to an EPC.
Figure 8:
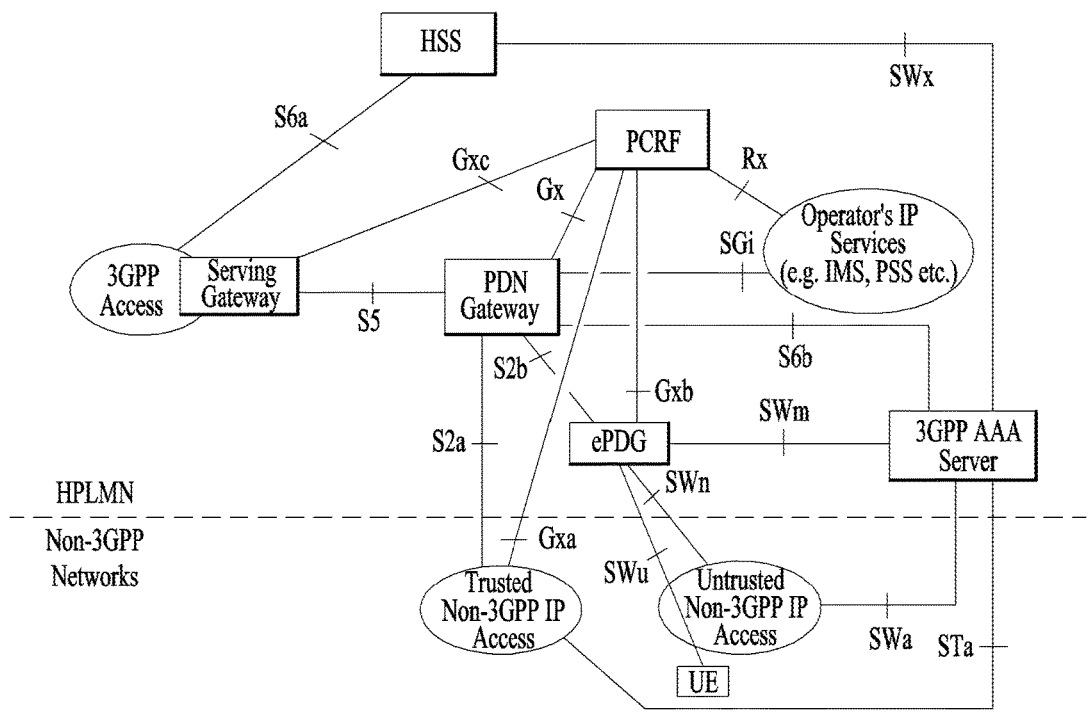

FIGS. 7 and 8 illustrate an architecture for connecting a WLAN to an EPC. Specifically, FIG. 7 illustrates an architecture in which a WLAN is connected to a P-GW through an S2a interface (see 3GPP TS 23.402). As can be seen with reference to FIG. 7, a WLAN access network (in particular, it is a trusted WLAN access network since the S2a interface is an interface for connecting a trusted non-3GPP access to the EPC) is connected to the P-GW through the S2a interface. The content disclosed in TS 23.402 is incorporated herein by reference for an architecture for a trusted WLAN access network (TWAN).

FIG. 8 illustrates an architecture in which a WLAN is connected to a P-GW through an S2b interface. As can be seen with reference to FIG. 8, a WLAN access network (in particular, it is an untrusted WLAN access network since the S2b interface is an interface for connecting an untrusted non-3GPP access to the EPC) is connected to the P-GW through an evolved packet data gateway (ePDG) connected to the P-GW through the S2b interface. Hereinafter, a trusted WLAN and an untrusted WLAN may be both referred to as a WLAN.

Utility of WLAN Access

Data of a UE may be offloaded to the WLAN access through a 3GPP access. A technology such as IP flow mobility and seamless offload (IFOM), multi access PDN connectivity (MAPCON), or the like has been proposed to support a multiple radio access. The MAPCON technology is a technology of transmitting data by using a 3GPP access and a Wi-Fi access through respective PDN connections. The IFOM technology is a technology of transmitting data by aggregating the 3GPP access and the Wi-Fi access to one PDN or P-GW.

Figure 9:
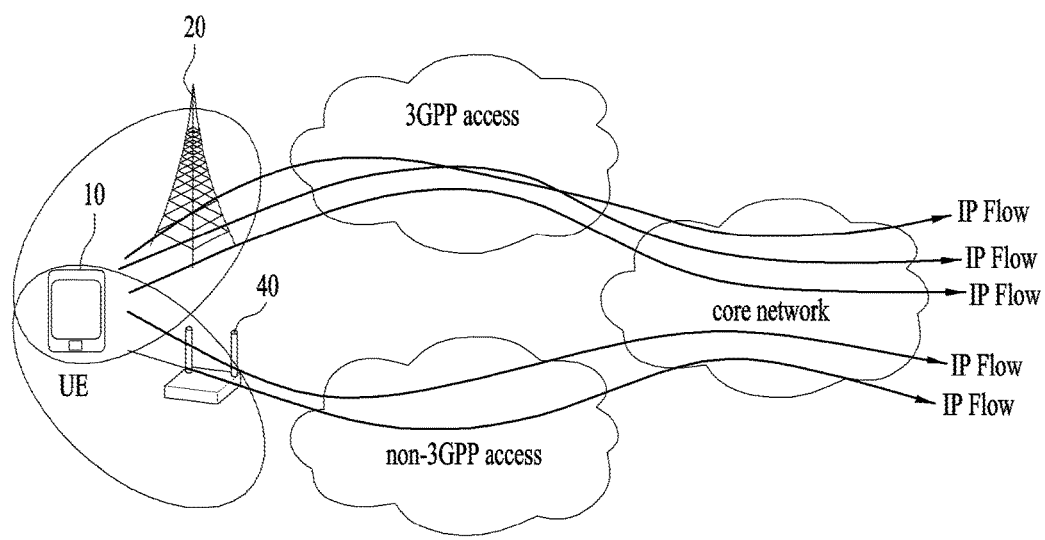
FIG. 9 is an exemplary view illustrating an example of IFOM technology.

FIG. 9 is an exemplary view of the IFOM technology. Referring to FIG. 9, the IFOM technology is to provide the same PDN connection through several pieces of different accesses. Such IFOM technology provides seamless transmission and reception through offloading onto a WLAN. Furthermore, the IFOM technology provides the transfer of IP flows having the same one PDN connection from one access to the other access. As described above, with the help of the technologies capable of offloading the traffic of UE onto a WLAN, the congestion of a cellular access of a mobile communication service provider can be reduced.

The provider provides a policy to the UE in order to divert the traffic onto the WLAN access and the UE may divert its data onto the wireless LAN in accordance with the policy. For provision of the policy to the UE, a 3GPP based access network discovery and selection function (ANDSF) may provide a policy associated with the wireless LAN.

FIGS. 10(a) and 10(b) illustrate network control entities for selecting an access network. Referring to FIG. 10(a), the ANDSF may be present in the home network (Home Public Land Mobile Network ('HPLMN')) of the UE. Furthermore, referring to FIG. 10(b), the ANDSF may also be present in the Visited Public Land Mobile Network (VPLMN) of the UE. When the ANDSF is present in the home network as described above, it may be called an H-ANDSF. When the ANDSF is present in the visited network, it may be called a V-ANDSF. The ANDSF is used to include the H-ANDSF and/or the V-ANDSF. The ANDSF can provide information on an inter-system movement policy (ISMP), information for access network search and information on inter-system routing policy (ISRP), for example, a routing rule.

Meanwhile, the IFOM is performed based on a decision primarily made by the UE, and as a result, the UE that can use the 3GPP access network and the WLAN access network at the same time may perform IP flow mobility between the two access networks. Afterwards, the IFOM has evolved to the NBIFOM (network based IP flow mobility) technology which is the IFOM technology based on GTP or PMIP which is network based mobility protocol. In the NBIFOM, IP flow mobility may be performed by a leading decision and initiation of the network as well as IP flow mobility performed by initiation of the UE. The NBIFOM may be categorized into UE-initiated NBIFOM and network-initiated NBIFOM in accordance with an entity for triggering a decision of IP flow mobility. In the UE-initiated NBIFOM and the network-initiated NBIFOM, only one mode is used for one PDN connection. Therefore, multi-access PDN connection may be operated within a UE-initiated mode or a network-initiated mode. That is, mode selection is performed when PDN connection is established, and the same mode is maintained as far as PDN connection is in an active mode.

Figure 11:
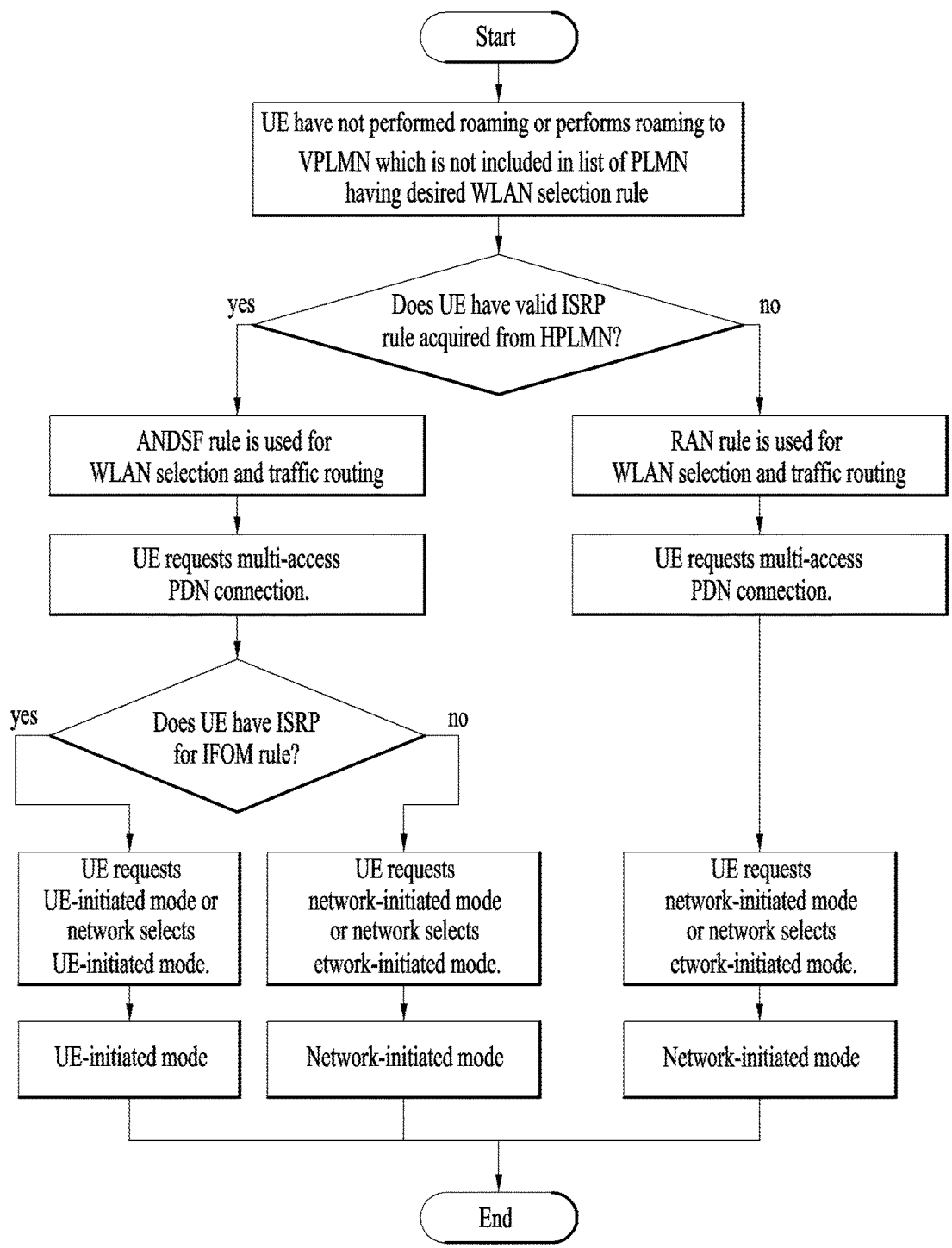
FIG. 11 illustrates a procedure of selecting any one of a UE-initiated mode and a network-initiated mode.

Mode selection will be described in more detail with reference to FIG. 11. FIG. 11 illustrates a procedure of selecting any one of a UE-initiated mode and a network-initiated mode. Referring to FIG. 11, when a UE capable of performing NBIFOM intends to request multi-access PDN connection generation, the UE determines a mode for requesting the PDN connection generation. It is assumed that the UE supports both the ANDSF procedure and the RAN-assisted WLAN interworking. If the UE has not performed roaming to VPLMN or has performed roaming to VPLMN but uses a WLAN selection rule provided by HPLMN, the UE is determined to use the ANDSF rule or RAN rule for WLAN selection and traffic routing depending on whether the UE has a valid ISRP rule acquired from the HPLMN. If the UE has performed roaming to VPLMN and provided to use WLAN selection rule provided by the VPLMN, the UE is determined to use the ANDSF rule or RAN rule for WLAN selection and traffic routing depending on the UE has a valid ISRP rule acquired from the VPLMN. A later procedure is the same as that shown in FIG. 11.

If the UE has a valid ISRP, the UE determines to use the ANDSF rule for WLAN selection and traffic routing. Subsequently, the UE performs an operation for requesting multi-access PDN connection generation. At this time, the UE determines whether it has ISRP for IFOM rule. If the UE has ISRP for IFOM rule, the UE requests PDN connection generation operated in the UE-initiated mode. Alternatively, the network selects the UE-initiated mode for the PDN connection. If the UE does not have ISRP for IFOM rule, the UE requests the network-initiated mode. Alternatively, the network may select the network-initiated mode with respect to the PDN connection.

Meanwhile, if the UE does not have a valid ISRP, the UE determines to use the RAN rule for WLAN selection and traffic routing. Subsequently, the UE performs the operation for requesting multi-access PDN connection generation. At this time, the UE requests the PDN connection generation operated in the network-initiated mode. Alternatively, the network may select the network-initiated mode with respect to the PDN connection.

Embodiment

Hereinafter, a signal transmission and reception method related to NBIFOM according to the embodiment of the present invention will be described based on the aforementioned description. In the following description, IP flow may mean, or may be used together with, traffic, packet, data, IP service, application, etc. Also, an access may mean, or may be used together with, RAT, access network, radio access, etc. In the following description, description made based on any one network entity of the network and the UE may be regarded as the description made based on the other network entity. For example, if the UE receives a specific message from the MME, it will be understood that the MME transmits a specific message to the UE.

The UE may receive a routing rule from the network. In this case, the routing rule may include an access type in which the IP flow should be routed. The access type included in the routing rule may be a 3GPP access or a WLAN access.

If it is not appropriate that the UE changes the access to an access type indicated/notified by the routing rule, that is, if the corresponding access has already lost or intends to lose, the UE may transmit reject/rejection for the routing rule to the network.

Afterwards, if the access type included in the routing rule is usable, the UE may transmit information indicating the usable access type included in the routing rule to the network. If this operation is omitted, efficiency of NBIFOM may be very lowered. In more detail, in case of the network-initiated NBIFOM mode among the aforementioned NBIFOM modes, the network may provide the UE with a desired mapping between IP flows and access links, that is, routing rule. In this case, the UE may accept or reject IP flow mobility by means of the network, and cannot initiate/request IP flow mobility by itself. That is, if one mode is selected, the network entity cannot generate/provide the routing rule repeatedly. That is, both the UE and the network cannot initiate/request IP flow mobility with respect to one PDN connection. This is because that collision of different routing rules may occur if two entities generates the different routing rules with respect to the same IP flow, for example, if the UE generates a routing rule for routing to the 3GPP access with respect to IP flow 1 and the network generates a routing rule for routing to the WLAN access with respect to IP flow. Restriction of in generation of the routing rule according to the related art does not process the case that the access type included in the routing rule is usable after the UE rejects the routing rule transmitted from the network. That is, since the UE cannot generate the routing rule in spite of the fact that the access type included in the routing rule is usable, there is inconsistency in that the usable access cannot be used. Therefore, the UE may transmit information indicating that the access type included in the routing rule is usable, whereby the network may use the corresponding access type by retransmitting/updating the routing rule.

In the above description, it is assumed that the NBIFOM mode related to PDN connection of the UE is the network-initiated mode, and the UE fails to generate the routing rule in the network-initiated mode. The NBIFOM mode related to PDN connection is maintained until PDN connection is released. In this case, PDN connection may be one of a plurality of PDN connections generated by the UE.

Also, rejection of the routing rule may include information on a cause of rejection. In this case, the cause may be one of quality of the access type, coverage related to the access type, and loss of the access type. However, the embodiment of the present invention is not limited to the listed causes.

Hereinafter, the embodiment of the present invention will be described in view of the aspect that the network stops the network-initiated NBIFOM and again resumes the network-initiated NBIFOM.

The network may transmit a routing rule for routing a specific IP flow to the 3GPP access, to the UE. At the time when the routing rule is received, the UE has already lost the 3GPP access or intends to lose the 3GPP access. In this respect, the UE transmits a rejection message of the routing rule for routing the NBIFOM request received from the network, that is, the specific IP flow to the 3GPP access, to the network (or transmits a message, which does not accept the routing rule, to the network). At this time, the UE may include information on a cause of rejection in the message.

Alternatively, the network may transmit the routing rule for routing the specific IP flow to the WLAN access to the UE. At the time when the routing rule is received, the UE has already lost the WLAN access or intends to lose the WLAN access. The UE transmits a rejection message of the routing rule for routing the NBIFOM request received from the network, that is, the specific IP flow to the WLAN access, to the network (or transmits a message, which does not accept the routing rule, to the network). At this time, the UE may include information on a cause of rejection in the message.

The information on a cause of rejection may be one or more of information indicating that the 3GPP access has been lost, information indicating that the 3GPP access is to be lost, information indicating that the 3GPP access is not available, information indicating that IP flow cannot be routed to the 3GPP access, and information indicating that the routing rule for requesting routing to the 3GPP access is not valid.

Recognition/determination that the UE has lost the access may be caused by various kinds of information. For example, when signal strength is weak or a packet loss rate is more than a certain amount, the access may be determined as loss. The specific IP flow may be all IP flows associated with the UE, or may be some of IP flows. The routing rule transmitted from the network to the UE may assume that the IP flow may be transmitted to the 3GPP access or the WLAN access regardless of routing of the IP flow to a random access, that is, regardless of a target access of routing.

Subsequently, the network which has received the rejection message (or message that does not accept NBIFOM request) of the NBIFOM request from the UE does not transmit the routing rule for routing the specific IP flow to the rejected access (3GPP or WLAN access), to the UE. That is, the network pauses the NBIFOM request/operation for routing/steering the IP flow to the rejected access (3GPP or WLAN access) with respect to the UE.

As a cause of pausing the NBIFOM request for routing the IP flow to the WLAN access, it has been described that the network receives the rejection message (or message that does not accept NBIFOM request). In addition, the cause may include the following cases that i) the UE transmits a message for notifying that the WLAN access has been lost or intends to be lost, to the network, and ii) the UE transmits a routing rule for routing the IP flow to the 3GPP access, to the network, that is, transmits UE-initiated NBIFOM message to the network. At this time, the cause includes information indicating that the WLAN access has been lost or intends to be lost, and iii) the network recognizes that the WLAN access of the UE has been lost or removed. The above description may be applied to even the case that the access, which cannot route the IP flow, is the 3GPP access not the WLAN access. For example, in case of the 3GPP access, PCRF recognizes that the UE has removed the 3GPP access, through a procedure such as 5.3.8.2 UE-initiated Detach procedure of 3GPP TS 23.401. Alternatively, in case of the WLAN access, PCRF recognizes that the UE has removed the WLAN access, through a procedure such as 16.3 Detach and PDN disconnection in WLAN on S2a procedure of 3GPP TS 23.402. These causes may act in combination. The recognition is not limited to the above cases, and it has been also recognized that the WLAN access has been lost or removed, through the detach procedure and PDN disconnection procedure of the related art. Also, in addition, the PCRF may acquire the above information from another network node in various manners.

The network resumes the network-initiated NBIFOM operation which has been paused, if one or more of the following conditions are satisfied. That is, the NBIFOM request transmitted to the UE to route the IP flow to the WLAN access is resumed, whereby the network may transmit the NBIFOM request, which includes the routing rule for routing the IP flow to the WLAN access, to the UE if necessary.

If the network recognizes/determines that the UE has connection to the WLAN access or generates connection, the UE may separately transmit a message for notifying the recognizing/determining method to the network or may generate attach and/or PDN connection through the WLAN access. The above description may equally be applied to even the case that the access which has paused the network-initiated NBIFOM operation is the 3GPP access. For example, in case of the 3GPP access, the PCRF may recognize that the UE generates connection to the 3GPP access, through a procedure such as 5.3.2 Initial Attach or 5.10.2 UE requested PDN connectivity of 3GPP TS 23.401. Alternatively, in case of the WLAN access, the PCRF may recognize that the UE generates connection to the WLAN access, through a procedure such as 16.2 Initial Attach or 16.8 UE initiated PDN connectivity request procedure of 3GPP TS 23.402. However, connection to the WLAN access is not limited to the above procedure, and the PCRF may recognize that connection to the WLAN access is generated through attach procedure and PDN connection establishment procedure of the related art. Also, in addition, the PCRF may acquire the above information from another network node.

If the access which has paused the network-initiated NBIFOM operation is the WLAN access, it may mean connection to the P-GW through the WLAN access. This may mean that connection to the WLAN access is not regarded as above in case of NSWO (Non-Seamless WLAN Offload) which is a routing type of a packet to a backhaul network without connection to the P-GW through the WLAN access.

Also, the network-initiated NBIFOM operation may be resumed even in the case that the UE transmits NBIFOM request, which includes a routing rule for routing the specific IP flow to the WLAN access, that is, the UE-initiated NBIFOM request message to the network.

In the present invention, loss of the access may be construed as unavailable access, unusable access, not connectable access, etc., and recovery from loss of the access may be construed as available access, usable access, connectable access, etc.

Figure 12:
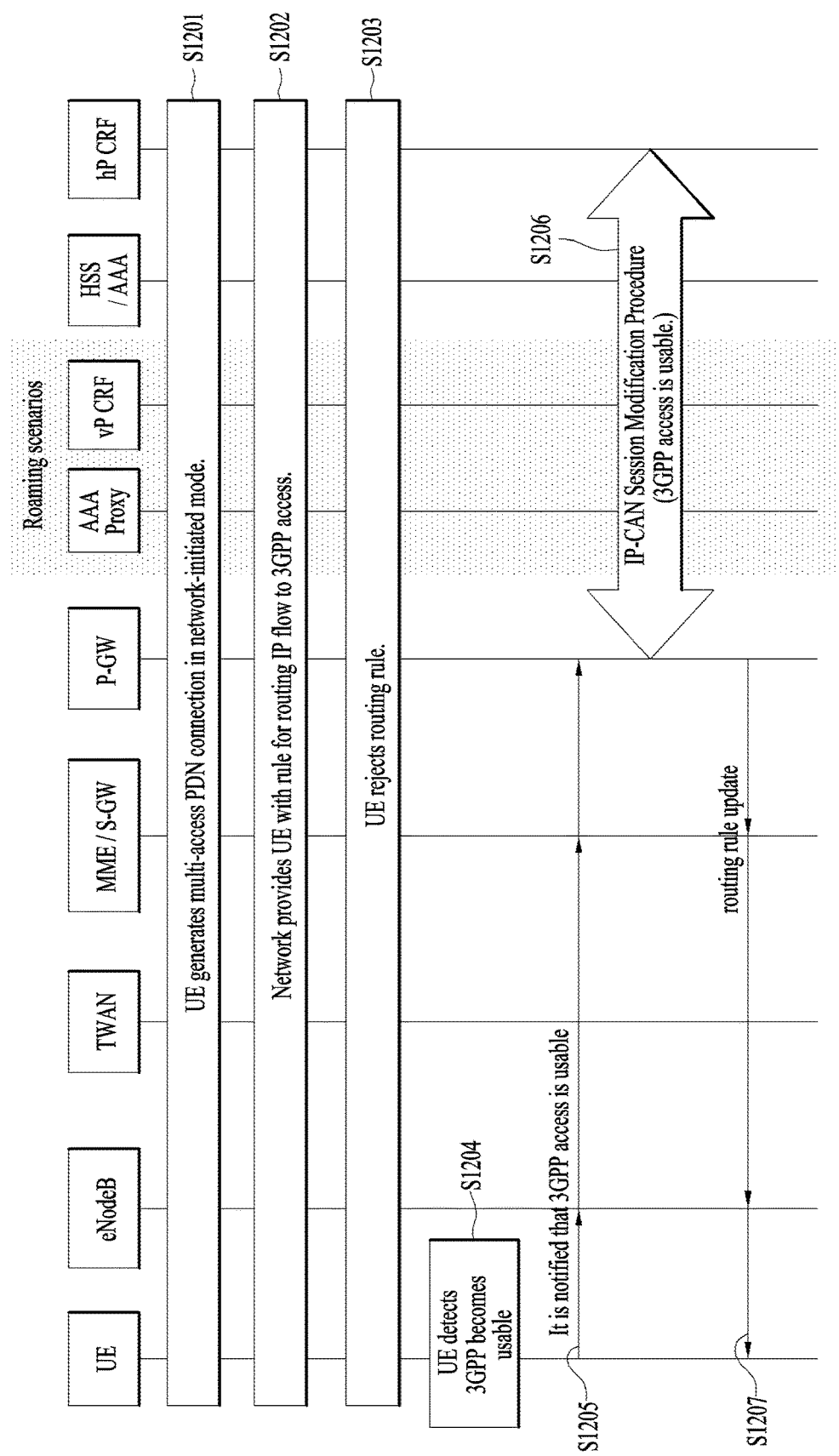
FIGS. 12 and 13 are exemplary views illustrating an operation between network nodes in accordance with the embodiment of the present invention.
Figure 13:
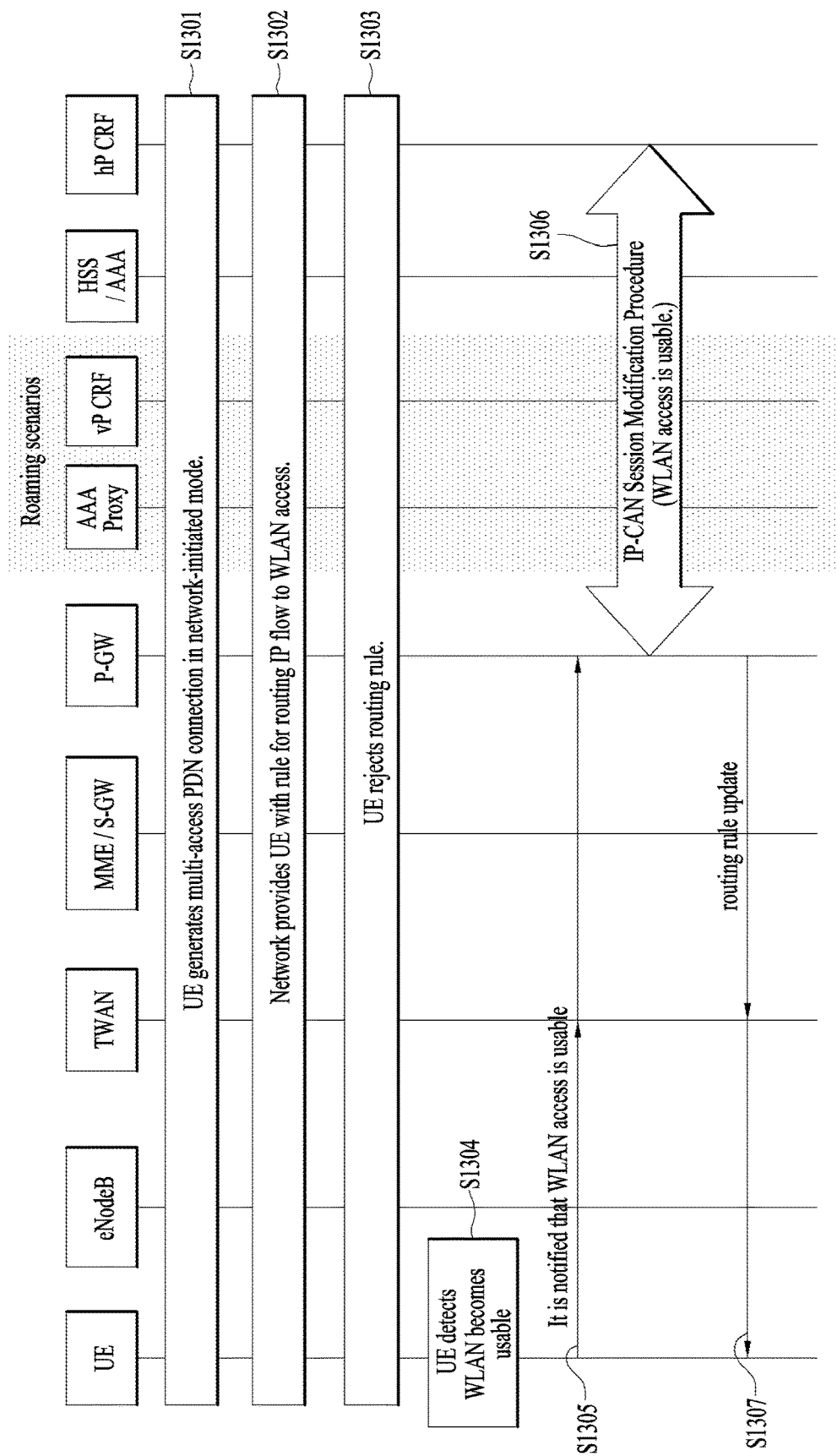

The operation between the respective network nodes according to the embodiment of the present invention is illustrated in FIGS. 12 to 13. The description of FIGS. 12 and 13 are not exclusive with the aforementioned embodiment, and may be carried out within a compatible range.

FIG. 12 illustrates that a routing rule for routing IP flow to the 3GPP access is transmitted in the network-initiated mode. In more detail, in step S1201, the UE generates multi-access PDN connection in the network-initiated mode. The UE may simultaneously be connected with the 3GPP access and the WLAN access, or may be connected with only one of the two accesses. In step S1202, the network transmits a routing rule for requesting routing of IP flow to the 3GPP access to the UE. In step S1203, the UE transmits a rejection message of the routing rule of the network to the network by reason that the UE intends to lose the 3GPP access, quality (for example, signal strength, etc.) of the 3GPP access is not good, the UE is out of 3GPP coverage, or the UE has lost the 3GPP access.

In step S1204, the UE senses that a 3GPP link (or 3GPP access) is usable. In step S1205, the UE transmits a message indicating that the 3GPP access is usable, to the network. In this drawing, although the message is transmitted to the network through the 3GPP access, the message may be transmitted through the WLAN access. Also, as the message used at this time, the conventional message may be used by being upgraded or a newly defined message may be used.

In step S1206, the P-GW provides the PCRF with information indicating that the 3GPP access received from the UE is usable. The PCRF updates a PCC rule (or routing rule) based on the information and provides the updated PCC rule to the P-GW. The P-GW may update the PCC rule (or routing rule) based on the information received from the UE instead of performing interaction with the PCRF. In step S1207, the P-GW updates the routing rule based on the updated PCC rule and then provides the updated routing rule to the UE.

Subsequently, FIG. 13 illustrates that the IP flow is routed to the WLAN.

Referring to FIG. 13, in step S1301, the UE generates multi-access PDN connection in the network-initiated mode. The UE may simultaneously be connected with the 3GPP access and the WLAN access. However, the UE may be connected with only one of the two accesses. In step S1302, the network provides the UE with a routing rule for requesting routing of IP flow to the WLAN access. In step S1303, the UE transmits a rejection message of the routing rule of the network to the network by reason that the UE intends to lose the 3GPP access, quality (for example, signal strength, etc.) of the WLAN access is not good, the UE is out of WLAN coverage, or the UE has lost the WLAN access. In step S1304, the UE senses that a WLAN link (or WLAN access) is usable. In step S1305, the UE transmits a message indicating that the WLAN access is usable, to the network. In this drawing, although the message is transmitted to the network through the WLAN access, the message may be transmitted through the 3GPP access. Also, as the message used at this time, the conventional message may be used by being upgraded or a newly defined message may be used. Also, the UE may notify the network that TWAN is usable instead of the WLAN access, and may notify the network that both the WLAN access and the TWAN are usable. In step S1306, the P-GW provides the PCRF with information indicating that the WLAN access received from the UE is usable. The PCRF updates a PCC rule (or routing rule) based on the information and provides the updated PCC rule to the P-GW. The P-GW may update the PCC rule (or routing rule) based on the information received from the UE instead of performing interaction with the PCRF. In step S1307, the P-GW updates the routing rule based on the updated PCC rule and then provides the updated routing rule to the UE.

Although TWAN is shown as the WLAN in FIGS. 12 and 13, an untrusted WLAN may be applied unlike FIGS. 12 and 13. In this case, the TWAN may be replaced with ePDG in the drawings, whereby the same procedure may be applied to the ePDG.

Although the access loss has been disclosed in the aforementioned description, the present invention may be applied to even the case that congestion related information such as congestion on the 3GPP access or the WLAN access or congestion on a core network (this may be expressed as core network connected to the 3GPP access or core network/TWAN connected to the WLAN access) is notified to the network as well as the case that the UE notifies the access loss related information to the network. Also, the present invention may be applied to even the case that the UE notifies information indicating that it is difficult to route a flow through several accesses due to a low battery state (or low power state), to the network.

Also, the routing rule may be construed as routing policy, routing information, IP flow steering information, etc. The network used in the embodiment means, but not limited to, PCRF, and may be various network nodes (e.g., P-GW) which involve in IP flow mobility.

Figure 14:
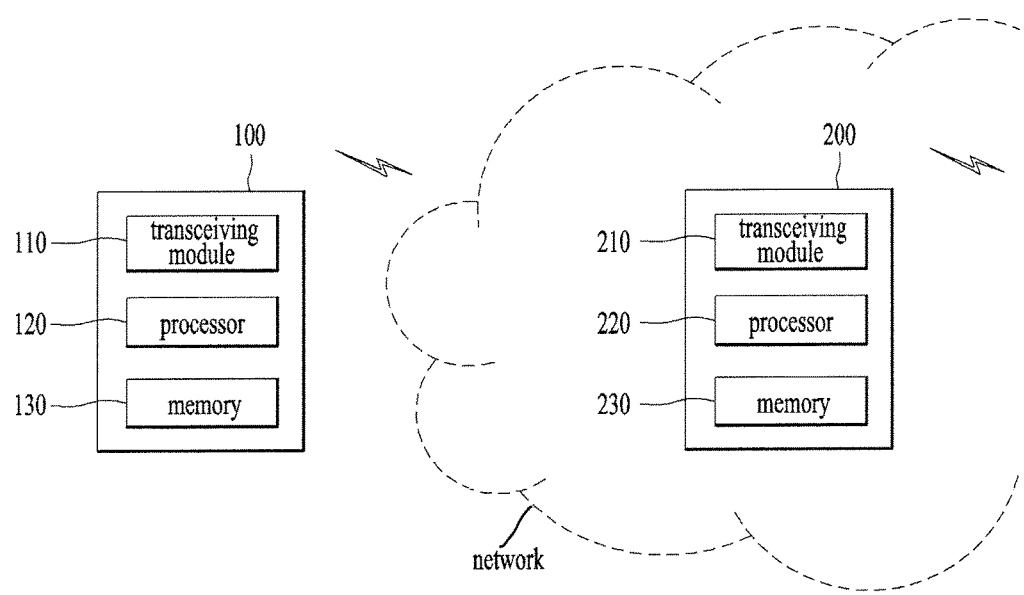
FIG. 14 is a diagram illustrating a node device according to the embodiment of the present invention.

FIG. 14 is a diagram illustrating configurations of a UE and a network node apparatus according to the preferred embodiment of the present invention.

Referring to FIG. 14, a UE 100 according to the present invention may include a transceiving module 110, a processor 120 and a memory 130. The transceiving module 110 may be configured to transmit various signals, data and information to an external device and receive various signals, data and information from the external device. The UE 100 may be connected with the external device through the wire and/or wireless. The processor 120 may control the overall operation of the UE 100, and may be configured to perform a function of operation-processing information to be transmitted to and received from the external device. Also, the processor 120 may be configured to perform a UE operation suggested in the present invention. The memory 130 may store the operation-processed information for a predetermined time, and may be replaced with a buffer (not shown).

Referring to FIG. 14, the network node apparatus 200 according to the present invention may include a transceiving module 210, a processor 220, and a memory 230. The transceiving module 210 may be configured to transmit various signals, data and information to an external device and to receive various signals, data and information from the external device. The network node apparatus 200 may be connected with the external device through the wire and/or wireless. The processor 220 may control the overall operation of the network node apparatus 200, and may be configured to perform a function of operation-processing information to be transmitted to and received from the external device. Also, the processor 220 may be configured to perform a network node operation suggested in the present invention. The memory 230 may store the operation-processed information for a predetermined time, and may be replaced with a buffer (not shown).

Also, the details of the aforementioned UE 100 and the aforementioned network node apparatus 200 may be configured in such a manner that the aforementioned various embodiments of the present invention may independently be applied to the aforementioned UE 100 and the aforementioned network node apparatus 200, or two or more embodiments may simultaneously be applied to the aforementioned UE 100 and the aforementioned network node apparatus 200, and repeated description will be omitted for clarification.

The aforementioned embodiments according to the present invention may be implemented by various means, for example, hardware, firmware, software, or their combination.

If the embodiments according to the present invention are implemented by hardware, the method according to the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the method according to the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Although the aforementioned various embodiments of the present invention have been described based on the 3GPP system, the aforementioned embodiments may equally be applied to various mobile communication systems.

The invention claimed is:

1. A method for transmitting and receiving a signal related to network-based IP flow mobility (NBIFOM) of a UE in a wireless communication system, the method comprising the steps of:
receiving a routing rule in the UE from a network in a network-initiated mode in which the UE fails to generate the routing rule;
transmitting a rejection of the routing rule to the network; and
transmitting, to the network, information indicating that an access type included in the routing rule is usable when the access type included in the routing rule becomes usable.

2. The method according to claim 1, wherein an NBIFOM mode related to PDN connection is maintained until the PDN connection is released.

3. The method according to claim 1, wherein the PDN connection is a multi-access PDN connection in which traffic can be routed through multi-access generated by the UE.

4. The method according to claim 1, wherein the routing rule includes an access type to which an IP flow should routed.

5. The method according to claim 4, wherein the access type included in the routing rule is a 3GPP access.

6. The method according to claim 4, wherein the access type included in the routing rule is a WLAN access.

7. The method according to claim 1, wherein the rejection of the routing rule includes information on a cause of rejection.

8. The method according to claim 7, wherein the cause is one of quality of the access type, coverage related to the access type, and loss of the access type.

9. The method according to claim 1, wherein the information indicating the access type included in the routing rule is usable is transmitted through the same access as the access type included in the routing rule.

10. The method according to claim 1, wherein the information indicating the access type included in the routing rule is usable is transmitted through the same access as the access type that has received the routing rule.

11. The method according to claim 1, further comprising the step of receiving a routing rule, which includes the usable access type, from the network after transmitting the information indicating that an access type included in the routing rule is usable to the network.

12. A UE for transmitting and receiving a signal related to network-based IP flow mobility (NBIFOM) in a wireless communication system, the UE comprising:
a transceiving module; and
a processor,
wherein the processor receives a routing rule from a network in a network-initiated mode in which the UE fails to generate the routing rule, transmits a rejection of the routing rule to the network, and transmits, to the network, information indicating that an access type included in the routing rule is usable.

* * * * *